(12) United States Patent
Lagier et al.

(10) Patent No.: US 12,487,348 B2
(45) Date of Patent: Dec. 2, 2025

(54) ACOUSTIC TRANSMITTING ANTENNA (71) Applicant: THALES, Courbevoie (FR)

(72) Inventors: Yves Lagier, Sophia Antipolis (FR); Raphaël Lardat, Sophia Antipolis (FR); Jérémie Todesco, Sophia Antipolis (FR)

(73) Assignee: THALES, Courbevoie (FR)

( * ) Notice: Subject to any disclaimer, the term of this patent is extended or adjusted under 35 U.S.C. 154(b) by 1147 days.

(21) Appl. No.: 17/287,097

(22) PCT Filed: Oct. 16, 2019

(86) PCT No.: PCT/EP2019/078083
§ 371 (c)(1),
(2) Date: Apr. 20, 2021

(87) PCT Pub. No.: WO2020/083724
PCT Pub. Date: Apr. 30, 2020

(65) Prior Publication Data
US 2021/0389440 A1   Dec. 16, 2021

(30) Foreign Application Priority Data

Oct. 22, 2018 (FR) ........................ 1801114

(51) Int. Cl.
*G01S 7/534* (2006.01)
*B06B 1/06* (2006.01)
(Continued)

(52) U.S. Cl.
CPC ............ *G01S 7/534* (2013.01); *B06B 1/0633* (2013.01); *G01S 7/52004* (2013.01); *G10K 11/008* (2013.01); *B06B 2201/74* (2013.01)

(58) Field of Classification Search
None
See application file for complete search history.

(56) References Cited

U.S. PATENT DOCUMENTS 8,139,443 B2 * 3/2012 Armstrong ............... H04R 1/44
367/153
8,717,849 B1   5/2014 Zarnetske et al.
(Continued)

FOREIGN PATENT DOCUMENTS

EP   2 388 079 A2   11/2011
FR   2 776 161 A1   9/1999
(Continued)

OTHER PUBLICATIONS

Li, et al., "The simulation design of low frequency broadband transmit-receive transducer with composite fluid cavity", 2017 Symposium on Piezoelectricity, Acoustic Waves, and Device Applications (SPAWDA), pp. 265-256, Oct. 2017.
Notice of Rejection issued in Japanese Patent Application No. 2021-546463, dated Sep. 26, 2023, with English translation.

Primary Examiner — Hovhannes Baghdasaryan
Assistant Examiner — Joseph C Fritchman
(74) Attorney, Agent, or Firm — BakerHostetler (57) ABSTRACT

An acoustic antenna intended to equip a sonar, the antenna being centred around a first longitudinal axis and includes at least a first assembly of at least two transducers and a second assembly of at least two transducers stacked along the longitudinal axis, each transducer having at least a radial mode having a resonance frequency, referred to as the radial frequency, and a cavity mode having a resonance frequency, referred to as the cavity frequency, wherein the transducers of the first assembly are configured to transmit sound waves in a first continuous frequency band extending at least between the cavity and radial frequencies of the transducers of the first assembly and the transducers of the second assembly are configured to transmit sound waves in a second continuous frequency band extending at least between the cavity and radial frequencies of the transducers of the second assembly, in that the cavity frequency of a transducer (Continued)

of the second assembly is equal to the radial frequency of a transducer of the first assembly plus or minus $(fr1-fc1)/10$, $fr1$ being the radial frequency of the transducer of the first assembly and $fc1$ being the cavity frequency of the transducers of the first assembly and wherein the transducers of the second assembly are positioned between the transducers of the first assembly and in that no transducer of the first assembly is positioned between the transducers of the second assembly.

13 Claims, 4 Drawing Sheets

(51) Int. Cl.
*G01S 7/52* (2006.01)
*G10K 11/00* (2006.01)

(56) References Cited

U.S. PATENT DOCUMENTS

| | | |
|---|---|---|
| 9,001,623 B1 | 4/2015 | Sharp et al. |
| 2002/0043897 A1 | 4/2002 | Dunn et al. |
| 2002/0159336 A1 | 10/2002 | Brown et al. |
| 2016/0193629 A1 | 7/2016 | Hardie |
| 2017/0301332 A1* | 10/2017 | Lagier ............ G10K 11/008 |
| 2019/0060954 A1* | 2/2019 | Mosca ............ G10K 15/04 |

FOREIGN PATENT DOCUMENTS

| | | |
|---|---|---|
| FR | 3 026 569 A1 | 4/2016 |
| JP | 2011-244133 A | 12/2011 |
| WO | 2015/019116 A1 | 2/2015 |

\* cited by examiner

ACOUSTIC TRANSMITTING ANTENNA

CROSS-REFERENCE TO RELATED APPLICATIONS

This application is a National Stage of International patent application PCT/EP2019/078083, filed on Oct. 16, 2019, which claims priority to foreign French patent application No. FR 1801114, filed on Oct. 22, 2018, the disclosures of which are incorporated by reference in their entirety.

FIELD OF THE INVENTION

The invention relates to acoustic transmitting antennas, in particular to acoustic transmitting antennas in the field of low- and medium-frequency systems and to a method for calibrating such an antenna. The invention applies in particular, but is not limited, to variable-depth sonars. It may also be applied to other types of sonar such as for example fixed-antenna sonar, protection sonar or port sonar.

BACKGROUND

Marine platforms are generally equipped with submerged sonar antennas in order to detect and/or locate objects underwater. A sonar antenna comprises a set of stacked transducers for transmitting acoustic signals, mounted on a support. The signals are received by a set of receivers, such as hydrophones, arranged according to a configuration chosen with respect to the configuration of the set of transmitting transducers.

Current antennas for variable-depth sonar ("sound navigation and ranging") transmission are produced according to various architectures.

Planar antennas made up of an array of elementary transducers may be used. These antennas perform the transmission of the sonar signals. Their transducers are often of Tonpilz type, which makes them bulky and heavy. Specifically, Tonpilz transducers require the active element (i.e. the piezoelectric, magnetostrictive or electrostrictive material of the antenna) to be equipped with bulky mechanical parts, such as a seismic mass at the rear, a roof and a sealed housing. In addition, submerged operation of these transducers involves providing a hydrostatic-pressure compensation device, without which their submerged performance is severely degraded. This antenna architecture is unsuitable for a low-mass towed object design and involves oversizing the other elements of the system.

In terms of compactness and weight, other architectures are preferable, such as antennas made up of a vertical array of compact flextensional transducers. However, this type of antenna does not allow a frequency bandwidth needed for recent wideband sonar to be obtained, because their transducers are mono-resonant and operate in a mechanical flexion mode which is highly overstrained by nature. Low frequencies are therefore achieved through the use of mechanical flexion. This antenna is compact enough to decrease the bulk and the mass of the system, but it has the drawback of minimizing the volume of active material which may be detrimental to the deliverable acoustic power and therefore to the sound level. The bandwidth of these antennas remains much smaller than an octave, an octave being a frequency range of the form [f; 2f].

Antennas that consist of a vertical array of transducers of "slotted cylinder" type are also used to achieve a compact and low-mass antenna. This type of transducer is also based on a mechanical flexion system and therefore inherently has a frequency bandwidth equivalent to that of flextensional transducers. patent U.S. Pat. No. 9,001,623 proposes integration thereof into a towed body and patent U.S. Pat. No. 8,717,849 proposes a variant thereof. This architecture allows a compact and lightweight antenna to be produced, but remains limited in terms of frequency band and volume of active material. To overcome this, the antenna is extended lengthwise, but the acoustic energy is then focused in a reduced volume of fluid, which may decrease the detection performance of the sonar. The extension of the antenna lengthwise is also disadvantageous in terms of navigation of the towed body, especially at high speed. In addition, its integration on the towed body is complex and increases the mass of the towed body, and consequently increases the complexity of operational use.

It is also possible to use antennas made up of a vertical array of compact, wideband transducers of FFR ("free-flooded ring") type in order to increase the width of the transmission frequency band. This type of antenna may be present on sonar towed by surface vessels. Patent FR 2776161 gives one example thereof. The operation of these transducers is based on the coupling of two resonance modes which allows bandwidths of the order of an octave to be obtained. In addition, the ratio of active material is very high with respect to the total mass, and therefore it is possible to achieve high-power transmissions, which is favorable with respect to the sound level. However, these antennas do not allow a plurality of octaves to be covered.

It is also possible to use antennas made up of a vertical array of transducers divided into groups of at least two transducers in order to optimize the transmission bandwidth and the sound level (FR 3026569). However, as before, it is not possible to cover a plurality of octaves.

In order to increase the useful bandwidth, it is possible to combine a plurality of FFR transducers of different sizes (WO 2015/019116), but this leads to an increase in mass and therefore in the power requirement, which makes the system complex. Compared with the antenna of patent FR 2776161, the mass and the power requirement are 2.5 to 3 times higher. In addition, this solution is limited at the acoustic level because there are acoustic interactions between the different transducers and an effect of the small transducers being acoustically masked by the larger transducers is observed.

SUMMARY OF THE INVENTION

The invention aims to overcome the aforementioned drawbacks and limitations of the prior art. More specifically, it aims to provide an acoustic antenna that has a wide frequency band without negatively affecting the sound level, while keeping to dimensions similar to the prior art in terms of mass, bulk and power.

One subject of the invention is therefore an acoustic antenna intended to equip a sonar, the antenna being centered around a first longitudinal axis and comprising at least a first set of at least one transducer and a second set of at least two transducers stacked along said longitudinal axis, each transducer having at least one radial mode having a resonance frequency, referred to as the radial frequency, and one cavity mode having a resonance frequency, referred to as the cavity frequency, characterized in that the transducers of the first set are configured to transmit sound waves in a first continuous frequency band extending at least between the cavity frequencies and the radial frequencies of the transducers of the first set and the transducers of the second set are configured to transmit sound waves in a second continuous frequency band extending at least between the cavity frequencies and the radial frequencies of the transducers of the second set, in that the cavity frequency of a transducer of the second set is substantially equal to the radial frequency of a transducer of the first set plus or minus (fr1−fc1)/10, fr1 being the radial frequency of the transducer of the first set and fc1 being the cavity frequency of the transducer of the first set.

According to some embodiments of the invention:

the first set of transducers comprises at least two transducers and the transducers of the second set are placed between the transducers of the first set;

the transducers of the second set are divided into sub-groups, each sub-group comprising at least two transducers of the second set, the spacing between each sub-group being greater than or equal to the spacing between two transducers of one and the same sub-group, and each sub-group having at least one cavity mode having a resonance frequency, referred to as the group cavity frequency;

the second set comprises seven transducers divided into three sub-groups, the first sub-group comprising two transducers, the second group comprising three transducers, the third sub-group comprising two transducers, and the second sub-group being placed between the first and the third sub-group;

the group cavity frequency of at least one sub-group is equal to the radial frequency of the transducers of the first set plus or minus (fr1−fc1)/10 and the group cavity frequency of at least one other sub-group is equal to the cavity frequency of the transducers of the first set plus or minus (fr1−fc1)/10, fr1 being the radial frequency of the transducer of the first set and fc1 being the cavity frequency of the transducer of the first set;

the antenna comprises passive elements stacked along the first longitudinal axis, surrounding the transducers of the second set and having at least one radial mode having a resonance frequency, referred to as the radial frequency, equal to a radial frequency of the transducers of the second set plus or minus 0.1×fr2, advantageously equal to a radial frequency of the transducers of the second set plus or minus 0.05×fr2, with fr2 the radial frequency of the transducers of the second set and also having at least one cavity mode having a resonance frequency, referred to as the cavity frequency, within the first frequency band;

the passive elements are made of a material such that the E/ρ ratio of this material is higher than that of the material forming the transducers of the second set, E being the Young's modulus and ρ the density of the materials;

the passive elements are cylinders having a diameter larger than that of the transducers of the second set;

the transducers are FFR ("free-flooded ring") transducers made of piezoelectric ceramic or of magnetostrictive ceramic or of electrostrictive ceramics;

the transducers of the first set and of the second set have a circular, trapezoidal or polygonal cross section;

the antenna comprises at least a third set of at least two transducers stacked along K longitudinal axes parallel to the first longitudinal axis, K being greater than 1, the transducers of the third set having at least one radial mode having a resonance frequency, referred to as the radial frequency, and one cavity mode having a resonance frequency, referred to as the cavity frequency, equal to the radial frequency of the transducers of the second set plus or minus (fr2−fc2)/10, fr2 being the radial frequency of the transducers of the second set and fc2 the cavity frequency of the transducers of the second set, the transducers of the third set being configured to transmit sound waves in a third continuous frequency band extending at least between their cavity frequency and their radial frequency, the third frequency band having at least one frequency higher than the frequencies of the first and second frequency bands, and the meeting of the first, second and third frequency bands forming a continuous frequency band;

the K longitudinal axes are coincident with the first longitudinal axis;

the antenna comprises at least a first phase-shifter arranged so as to introduce a first phase shift between an excitation signal of the transducers of the first set and an excitation signal of at least a sub-group of transducers of the second set;

the antenna additionally comprises at least a second phase-shifter arranged so as to introduce a second phase shift between excitation signals of different sub-groups of transducers of the second set; and the antenna comprises N+1 groups of transducers of the same type and N phase-shifters arranged so as to introduce a phase shift between an excitation signal of the transducers of the first group and an excitation signal of another group, N being an integer greater than 1.

Another subject of the invention is a method for calibrating an acoustic antenna according to the invention, characterized in that it comprises the following steps:

a. exciting a first group of transducers of the same type and shorting the other transducers;

b. far-field measuring the phase of the pressure waves generated by the transducers of the first group;

c. exciting a second group of transducers of the same type and shorting the other transducers;

d. far-field measuring the phase of the pressure waves generated by the transducers of the second group;

e. calculating the phase difference between the phase obtained in step b and the phase obtained in step d;

f. adjusting a phase-shifter so that it introduces a phase shift equal to the difference calculated in step e to the excitation signal sent to the transducers of the second group.

BRIEF DESCRIPTION OF THE DRAWINGS

Other features, details and advantages of the invention will become apparent from reading the description provided with reference to the appended drawings, which are given by way of example and in which, respectively.

DETAILED DESCRIPTION

Throughout the description, the term "cylinder" is used in the general sense and refers to a ruled surface the generatrices of which are parallel, i.e. a surface in space made up of parallel lines. In the embodiments illustrated by the figures, the transducers and passive elements are annular in shape, i.e. in the shape of a cylinder of revolution.

Figure 1:
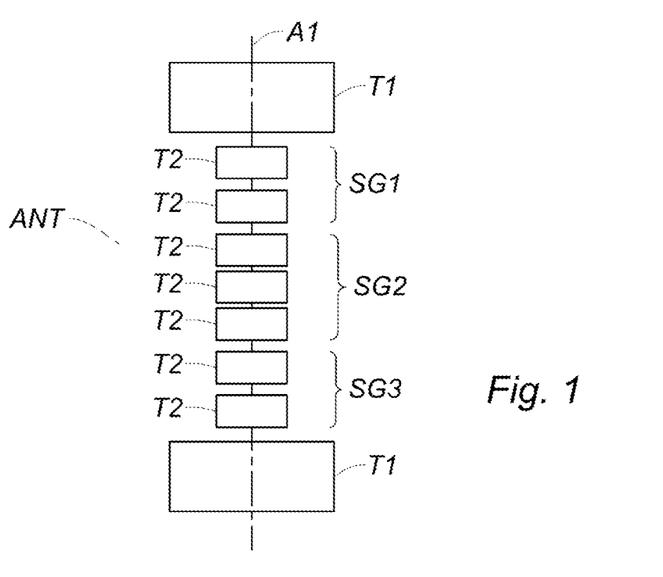
FIG. 1 shows an acoustic antenna according to a first embodiment.

FIG. 1 shows an acoustic antenna ANT according to a first embodiment. The antenna ANT is centered around a first longitudinal axis A1 and comprises a first set of at least two hollow cylindrical transducers T1 and a second set of at least two hollow cylindrical transducers T2. In this first embodiment, the first set comprises two transducers T1 and the second set seven transducers T2. The cylindrical transducers T1 and T2 are formed around the same longitudinal axis A1. The transducers T2 are placed between the transducers T1 without there being any physical overlap between the transducers T1 and T2. This makes it possible to avoid detrimental acoustic interactions, such as the masking of the transducers T2 by the transducers T1. Each transducer (T1, T2) has at least one radial mode having a resonance frequency, referred to as the radial frequency, and at least one cavity mode having a resonance frequency, referred to as the cavity frequency. The transducers T1 of the first set are configured to transmit sound waves in a first frequency band extending at least between the cavity frequencies and the radial frequencies of the transducers T1, and the transducers T2 of the second set are configured to transmit sound waves in a second frequency band extending at least between the cavity frequencies and the radial frequencies of the transducers T2. The transducers T1 and T2 have different physical dimensions, in particular the transducers T2 have smaller physical dimensions than those of the transducers T1, so that the cavity frequency of a transducer T2 of the second set, fc2, is substantially equal to the radial frequency of a transducer T1 of the first set, fr1, with a tolerance not greater than (fr1−fc1)/10, i.e. fc2=fr1±(fr1−fc1)/10 with fc1 the cavity frequency of a transducer T1. This makes it possible to obtain a continuous transmission frequency band comprising the frequencies of the first and second frequency bands.

The transducers T2 of the second set may be divided into sub-groups comprising at least two transducers. In this first embodiment, the transducers T2 are divided into three sub-groups (SG1, SG2, SG3). The first sub-group SG1 comprises two transducers T2, the second sub-group SG2 comprises three transducers T2 and the third sub-group SG3 comprises two transducers T2. The sub-group SG2 is placed between the sub-groups SG1 and SG3. The spacing between each sub-group, i.e. between the sub-groups SG1 and SG2 and the sub-groups SG2 and SG3 for this first embodiment, is greater than or equal to the spacing between the transducers T2 of one and the same sub-group. This makes it possible to perform a number of functions with the transducers T2.

Each sub-group (SG1, SG2, SG3) has at least one cavity mode having a resonance frequency, referred to as the group cavity frequency. Specifically, when two identical annular transducers are arranged one above the other with a short distance with respect to the acoustic wavelength of their cavity modes, these modes interact and their frequency decreases (the frequency of the radial mode is not affected). Thus, since the transducers T2 have equivalent physical dimensions, it is the spacings between the transducers T2 of one and the same sub-group which make it possible to modify the group cavity frequency of a sub-group.

At least one of the sub-groups has a group cavity frequency substantially equal to the radial frequency of the transducers T1 of the first set with a tolerance not greater than (fr1−fc1)/10, i.e. fcg=fr1±(fr1−fc1)/10, with fcg the group cavity frequency, fr1 the radial frequency of the transducers T1 and fc1 the cavity frequency of the transducers T1. At least one other of the sub-groups has a group cavity frequency substantially equal to the cavity frequency of the transducers T1 of the first set, i.e. a group cavity frequency is equal to the cavity frequency of the transducers T1 plus or minus (fr1−fc1)/10. For example, in this first embodiment, it is the transducers T2 of the first sub-group SG1 and of the third sub-group SG3 which have a group cavity frequency substantially equal to the radial frequency of the transducers T1 of the first set; and it is the transducers T2 of the second sub-group SG2 which have a group cavity frequency substantially equal to the cavity frequency of the transducers T1 of the first set. In this embodiment, the spacing between the transducers T2 within the second sub-group SG2 is therefore smaller than the spacing between the transducers T2 within the sub-groups SG1 and SG3. The radial frequency of the transducers T2 is not affected by the spacing of the transducers T2 within a sub-group. The use of a variable axial spacing between the transducers to adjust the frequency of their volume mode is known from document FR 3026569 cited above.

The sub-group SG2 makes it possible to increase the sound level of the transducers T1 in the vicinity of the cavity frequency of the transducers T1, i.e. to boost the transmission in the lowest frequencies of the first frequency band, while the transducers T2 of the sub-groups SG1 and SG3, by having one and the same cavity frequency that is substantially equal to the radial frequency of the transducers T1, make it possible to boost the transmission in the second frequency band.

Figure 2:
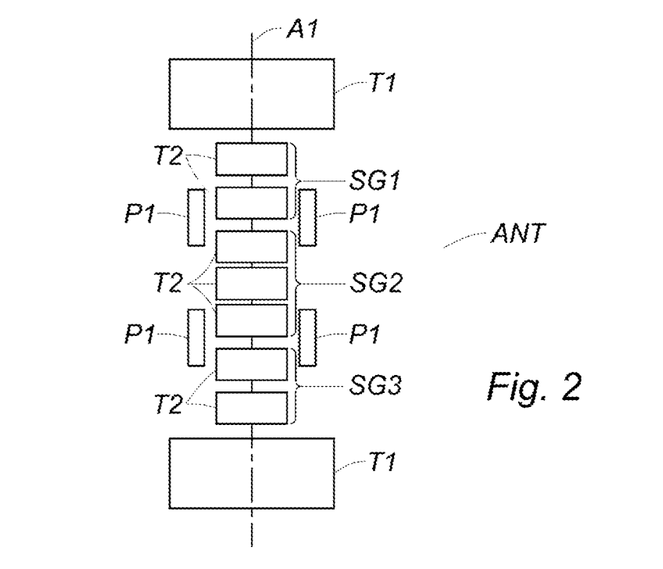
FIG. 2 shows an acoustic antenna according to a second embodiment.

FIG. 2 presents an acoustic antenna ANT according to a second embodiment of the invention. The acoustic antenna ANT is centered around a longitudinal axis A1 and comprises two sets of transducers (T1, T2) stacked along the longitudinal axis A1. The transducers T2 are placed between the transducers T1 without there being any physical overlap between the transducers T1 and T2 and are divided into three sub-groups SG1, SG2 and SG3 as shown in FIG. 1. The group cavity frequency of the sub-groups SG1 and SG3 is substantially equal to the radial frequency of the transducers T1 and the group cavity frequency of the sub-group SG2 is substantially equal to the cavity frequency of the transducers T1. In order to boost the sound level in the cavity frequency band of the transducers T1, i.e. at the lower boundary of the first frequency band, passive elements P1 are added to the antenna ANT. These passive elements P1 are stacked along the longitudinal axis A1, they surround the transducers T2 of the second set and are placed between the transducers T1 of the first set. They have at least one radial mode having a resonance frequency, referred to as the radial frequency, and at least one cavity mode having a resonance frequency, referred to as the cavity frequency. The passive elements P1 are cylinders, and more particularly rings.

In order not to interfere with the radial mode of the transducers T2, the passive elements P1 are made of a material such that the $E/\rho$ ratio of this material is higher than that of the material forming the transducers T2 of the second set, E being the Young's modulus of the materials and $\rho$ their density. This also makes it possible to obtain a passive element P1 with a diameter greater than that of the transducers T2 while having a radial mode resonating at the same frequency, i.e. the radial frequency of the passive elements P1 is substantially equal to the radial frequency of the transducers T2. The radial frequency of the elements P1 is equal to the radial frequency of the transducers T2 plus or minus 10% of the radial frequency of the transducers T2, i.e. $frp1=fr2\pm0.1\times fr2$, with frp1 the radial frequency of the passive elements P1 and fr2 the radial frequency of the transducers T2. Preferably, frp1=fr2±0.05×fr2.

In addition, to prevent the transmission of the passive elements P1 from masking the transmission of the transducers T2, the radial frequency of the passive elements P1 is substantially equal to the radial frequency of the transducers T2 of the second set SG2 and the cavity frequency of the passive elements P1 is within the first frequency band.

The excitation of the passive elements P1 comes from the acoustic field generated by the transducers T1 and the central transducers T2, i.e. the transducers T2 of the sub-group SG2 in this embodiment.

According to another embodiment, the cavity frequency of the passive elements P1 is substantially equal to the cavity frequency of the transducers T1 of the first set. This means that the cavity frequency of the passive elements P1 is equal to the cavity frequency of the transducers T1 plus or minus (lcp1+lc1)/2, with lcp1 the full width at half maximum of the cavity mode of the passive elements P1 and lc1 the full width at half maximum of the cavity mode of the transducers T1. This allows the sound level in the first frequency band to be boosted more effectively.

Figure 3A:
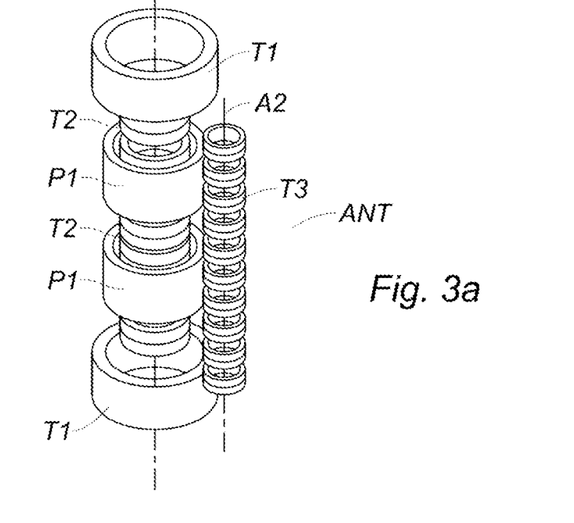
FIGS. 3a, 3b and 3c show an acoustic antenna according to, respectively, a third, a fourth and a fifth embodiment.
Figure 3B:
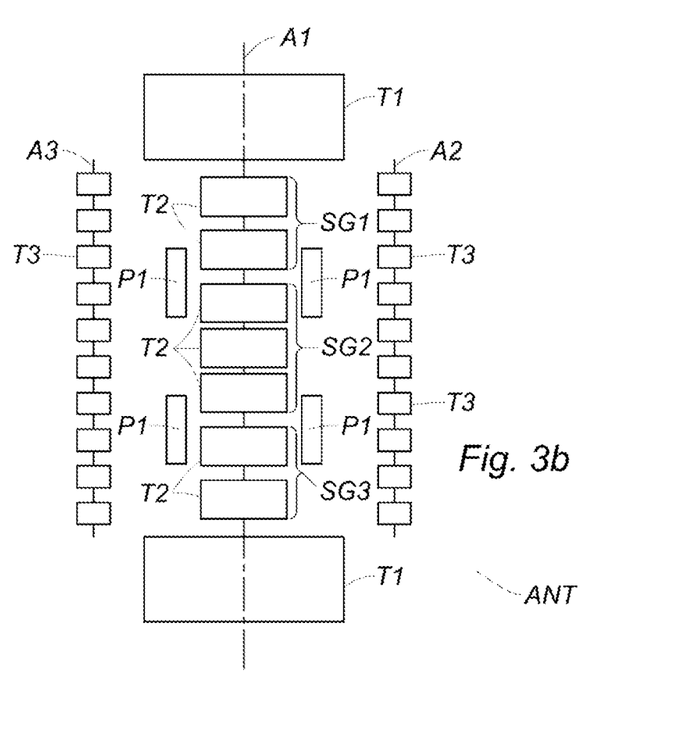
Figure 3C:
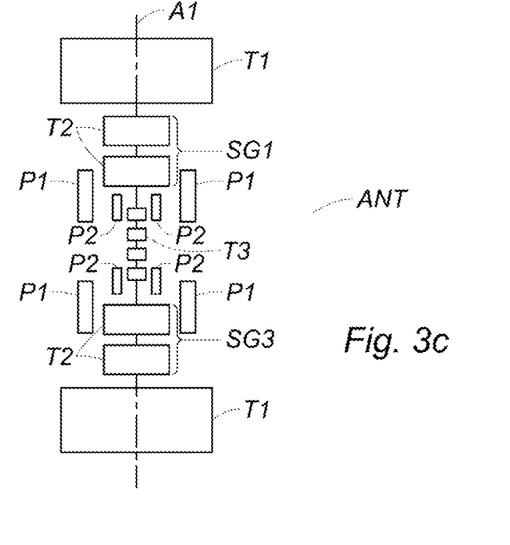

FIGS. 3a, 3b and 3c show, respectively, an acoustic antenna ANT according to a third, fourth and fifth embodiment. In these three embodiments, the acoustic antenna ANT is centered around a first longitudinal axis A1 and comprises three sets of transducers T1, T2 and T3. The transducers T1 and T2 are stacked along the first longitudinal axis A1 and the transducers T3 are stacked along a second longitudinal axis A2 parallel to the axis A1. The passive elements P1, the transducers T2 and T1 are arranged and dimensioned in the same way as in FIG. 2. More particularly, the cavity frequency of a transducer T2 is substantially equal to the radial frequency of the transducers T1 of the first set, and the transducers T2 are divided into three sub-groups SG1, SG2 and SG3. The group cavity frequency of the sub-groups SG1 and SG3 is substantially equal to the radial frequency of the transducers T1 of the first set and the group cavity frequency of the sub-group SG2 is substantially equal to the cavity frequency of the transducers T1. In addition, the radial frequency of the passive elements P1 is equal to the radial frequency of the transducers T2 plus or minus 0.1×fr2, preferably plus or minus 0.05×fr2 with fr2 the radial frequency of the transducers T2, and the cavity frequency of the passive elements P1 is within the first frequency band.

The transducers T3 of the third set are dimensioned so as to transmit sound waves in a third continuous frequency band different from the first and second frequency bands. The transducers T3 have at least one radial mode having a resonance frequency, referred to as the radial frequency, and at least one cavity mode having a resonance frequency, referred to as the cavity frequency. The third frequency band extends at least between the cavity frequencies and the radial frequencies of the transducers T3 of the third set. In addition, the cavity frequency of the transducers T3 of the third set is substantially equal to the radial frequency of the transducers T2 of the second set. The cavity frequency of the transducers T3 is therefore equal to the radial frequency of the transducers T2 plus or minus (fr2−fc2)/10, with fr2 the radial frequency of the transducers T2 and fc2 the cavity frequency of the transducers T2. The combination of the first, second and third frequency bands therefore makes it possible to obtain a continuous frequency band covering three octaves. This third frequency band is obtained by virtue of the dimensioning of the transducers T3 of the third set, which have smaller physical dimensions than those of the transducers T1 and T2.

In the embodiment shown in FIG. 3a, the longitudinal axis A2 is different from the axis A1, and the transducers T3 are therefore placed next to the structure comprising the transducers T1 and T2. This embodiment is possible because the transducers T3, being smaller than the transducers T1 and T2, will not mask the other transducers significantly.

In the embodiment shown in FIG. 3b, the antenna ANT comprises a plurality of transducers T3 stacked along two longitudinal axes A2 and A3 parallel to the axis A1 and distinct from the axis A1. This makes it possible to obtain a more compact antenna along the longitudinal axis A1, and also to overcome the effects of masking of the transducers T3 by the transducers T1 and T2 in order to be able to produce omnidirectional acoustic transmissions, if the transducers T3 stacked along the axes A2 and A3 operate in alternation with the other transducers, or to be able to produce orientable directional acoustic transmissions, if all of the transducers transmit simultaneously.

More generally, the antenna ANT may comprise a plurality of transducers T3 stacked along K longitudinal axes parallel to the axis A1, with K an integer greater than 1. More generally again, the antenna ANT may comprise a plurality of sets of transducers T2, T3, . . . , TN each comprising at least one transducer, the transducers of each set being stacked along K longitudinal axes parallel to the axis A1 on which the transducers T1 are stacked, N being an integer greater than 2.

In the embodiment shown in FIG. 3c, the longitudinal axis A2 is coincident with the axis A1. The transducers T3 are placed between the transducers T2, in particular between the sub-groups SG1 and SG3, the sub-group SG2 being replaced with the transducers T3. The spacing between the third set of transducers T3 is defined in a manner analogous to that of the transducers T2 with respect to the transducers T1 as indicated above. For example, in the figure, the spacing between the transducers T3 and the transducers of the sub-groups SG1 or SG3 is greater than the spacing between the transducers T3 and also greater than the spacing between the transducers T2 of one and the same sub-group.

More generally, when these K axes are positioned so that the radial bulk of the set of transducers T3 is of the order of the external diameter of the transducers T1 plus or minus 10%, a compact antenna suitable for installation on a towed body is obtained. This makes it possible to achieve both omnidirectional and orientable directional acoustic transmissions with the transducers T1, T2 and T3 active at the same time. In another embodiment, it is possible to have the K longitudinal axes coincident with the axis A1. This configuration may, for example, be used for a fixed installation.

In addition, in order to boost the sound level of the transducers T2, passive elements P2 may also be present. These passive elements P2 are stacked along the longitudinal axis A1 and surround the transducers T3 of the third set. The passive elements P1 may surround the passive elements P2, as shown in FIG. 3c. The passive elements P2 have at least one radial mode having a resonance frequency, referred to as the radial frequency, and at least one cavity mode having a resonance frequency, referred to as the cavity frequency. The radial frequency of the passive elements P2 is substantially equal to the radial frequency of the transducers T3 of the third set and the cavity frequency of the passive elements P2 is within the second frequency band. In the same way as above, this means that the radial frequency of the passive elements P2 is equal to the radial frequency of the transducers T3 plus or minus 0.1×fr3 and preferably plus or minus 0.05×fr3 with fr3 the radial frequency of the transducers T3. In addition, in the same way as for the passive elements P1, in order not to interfere with the radial mode of the transducers T3 around which they are positioned, the passive elements P2 are made of a material such that the E/ρ ratio of this material is higher than that of the material forming the transducers T3, E being the Young's modulus and ρ the density of the materials.

According to another embodiment, like for the transducers T1 and T2, it is also possible to divide the transducers T3 into sub-groups in order to boost the sound level in the lower portion of the third frequency band.

More generally, it is possible to produce an acoustic antenna with a recursive structure. The transducers are dimensioned so that the low-frequency mode, i.e. the cavity mode, of a transducer of a set i+1 is superposed onto the high-frequency mode, i.e. the radial mode, of a transducer of a set i.

If the transducers are single-mode, the same principle may be used by making the bottom of the transmission frequency band of the transducer of a set i+1 coincide with the top of the transmission frequency band of the transducer of a set i.

If the transducers are multimode, it is possible to use the same principle as for dual-mode transducers, i.e. transducers having a cavity mode and a radial mode, and make the highest resonance frequency of the transducers of set i coincide with the lowest resonance frequency of the transducers of set i+1.

In addition, the transducers are arranged so that those operating at higher frequency are inserted between at least two transducers operating at lower frequency.

More generally, the number of passive elements P1 and P2 is equal to N, with N a natural integer greater than 1. Each set or sub-group may comprise a number M, an integer greater than 1, of transducers. The acoustic antenna may therefore, for example, comprise three transducers T1, each surrounding, for example, a set of transducers T2 and/or T3. In addition, the transducers T1 of the first set could also be placed between two transducers of another set of transducers having a transmission frequency band lower than that of the transducers T1. The antenna may also comprise a plurality of transducers T1 divided into sub-groups of at least two transducers.

Figure 4:
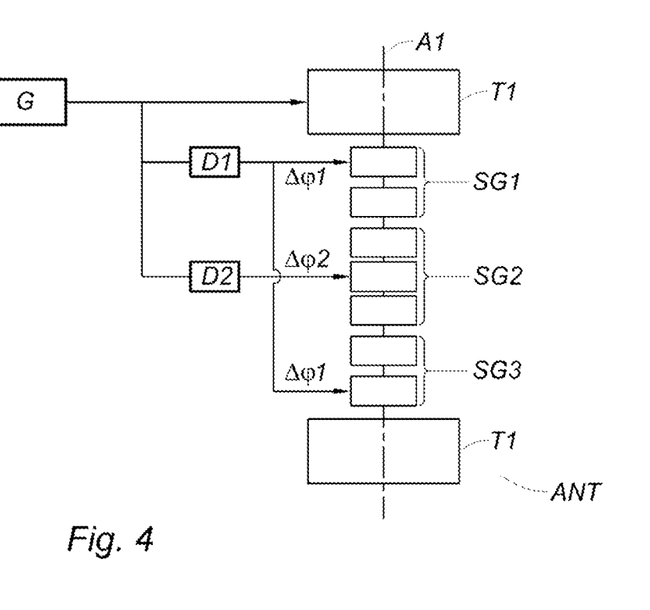
FIG. 4 shows an acoustic antenna according to a sixth embodiment.

FIG. 4 shows an acoustic antenna ANT according to a sixth embodiment. The physical dimensions of the antenna ANT and the extent of the frequency band covered by all of the transducers (T1, T2) or (T1, T2, T3) included in the antenna ANT may cause destructive interference to appear for certain frequencies of the frequency band, resulting in "gaps" in the frequency band of the antenna. This may be avoided by appropriately phase-shifting the excitation signals of the transducers forming these different "sub-antennas", which signals advantageously come from a single generator G. In the embodiment of FIG. 4, the transducers T1 of the first set serve as a reference and are directly connected to the generator G; the transducers T2 of the sub-groups SG1 and SG3 are connected to the generator G via a first phase-shifter D1 configured so as to apply a phase difference $\Delta\phi 1$ to the excitation signals received by these transducers; the transducers T2 of the sub-group SG2 are connected to the generator G via a second phase-shifter D2 configured so as to apply a phase difference $\Delta\phi 2$ to the excitation signals received by these transducers.

According to another embodiment, the antenna ANT comprises only one phase-shifter configured to apply a phase difference to the excitation signals sent to all of the transducers T2 of the second set with respect to the excitation signals sent to the transducers T1 of the first set.

Likewise, the antenna ANT may comprise a third phase-shifter configured to apply a phase difference to the excitation signals sent to the transducers T3 of the third set with respect to the excitation signals sent to the transducers T2 of the second set.

More generally, it is possible to take any set or sub-group of transducers as a reference and then add a phase-shifter to phase-shift the other transducers with respect to the reference set or sub-group.

According to another embodiment, the phase-shifters are adjustable.

According to one embodiment of the invention, the transducers (T1, T2, T3) are "free-flooded ring" (FFR) transducers. More particularly, they are made of piezoelectric ceramic or of magnetostrictive ceramic or of electrostrictive ceramic. The transducers may also be made with materials derived from mixtures for piezoelectric ceramics, such as single crystals or textured ceramics, or with materials based on different principles, such as electrodynamism.

According to another embodiment, the transducers (T1, T2, T3) have a circular, trapezoidal or polygonal cross section. The diameter of a transducer is defined by the longest length of a segment within its cross section.

According to another embodiment, it is possible to place at least two antennas ANT produced according to the invention next to one another in order to obtain more transmission power and directional transmission, which makes it possible in particular to increase the sound level in directional or omnidirectional transmission.

Figure 5:
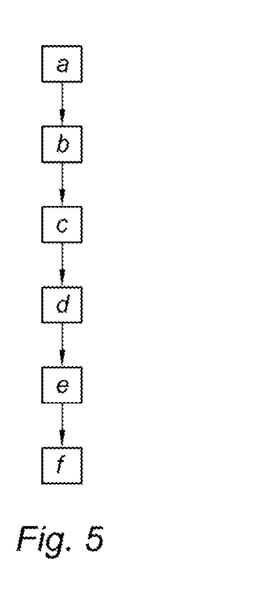
FIG. 5 shows a calibration method according to one embodiment of the invention.

FIG. 5 presents a method for calibrating an acoustic antenna according to one embodiment of the invention. In the first step a, a first group of transducers of the same type is excited and the other transducers are shorted. In the next step b, the phase of the pressure waves generated by the transducers of the first group is measured in the far field. In the next step c, a second group of transducers of the same type is excited and the other transducers are shorted. In step d, the phase of the pressure waves generated by the transducers of the second group is measured in the far field. Step e consists in calculating the phase difference between the measurements from steps b and d. Lastly, in step f, a phase-shifter is adjusted so that it introduces a phase shift equal to the phase difference calculated in step e to the excitation signal sent to the transducers of the second group.

For example, the first group of transducers is the first set of transducers T1 and the second group is the second set of transducers T2. It would therefore be possible to use the phase-shifter D1, present in FIG. 4, to introduce a phase shift equal to the phase difference calculated with these two groups of transducers.

In another example, the first group of transducers comprises the transducers T1 of the first set and the second group of transducers comprises the transducers T2 of the sub-group SG2. The phase-shifter D2, present in FIG. 4, could therefore be used to introduce a phase shift equal to the phase difference calculated with these two groups of transducers.

Figure 6A:
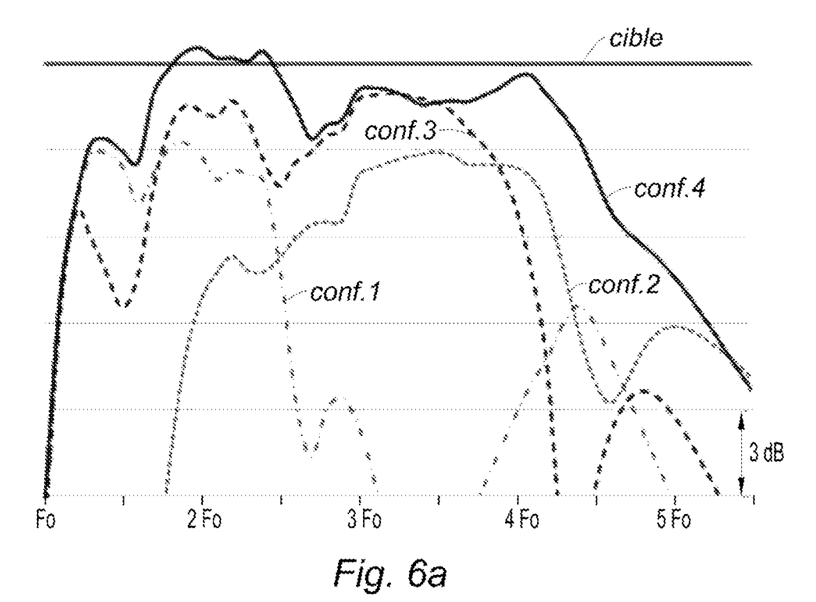
FIG. 6a shows results of simulations with an acoustic antenna according to one embodiment of the invention presented in FIG. 6b.
Figure 6B:
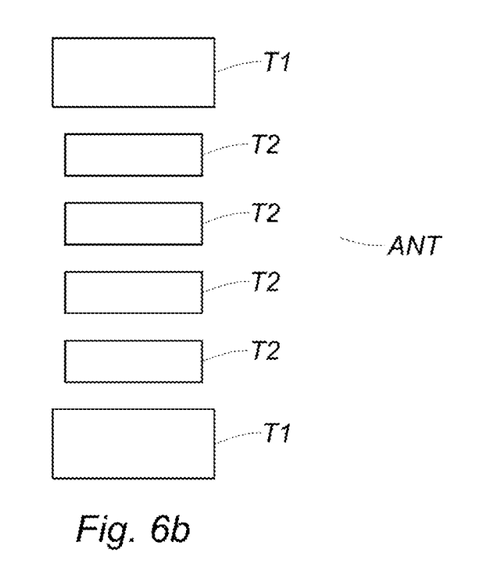

FIG. 6a presents results of simulations with an acoustic antenna according to one embodiment of the invention, in particular the transmission sound level as a function of the frequency. In this embodiment, presented in FIG. 6b, the acoustic antenna ANT comprises two transducers T1 belonging to the first set and four transducers T2 belonging to the second set. The transducers T2 are not divided into sub-groups. A number of configurations of the acoustic antenna are studied. In the first configuration, only the transducers T1 are active and transmit sound waves. In the second configuration, only the transducers T2 are active and transmit sound waves and in the third configuration, the transducers T1 and T2 are all active and transmit sound waves. Configurations 1 to 3 are produced without the use of phase-shifters. In configuration 4, the transducers T1 and T2 are all active, and phase-shifters are used to apply the calibration method described in FIG. 5.

Configuration 1 is represented by the gray dash-dotted curve, configuration 2 by the gray dashed curve, configuration 3 by the black dashed curve and configuration 4 by the solid black curve. Finally, the solid gray curve represents the desired maximum sound level. It may clearly be seen that if the transducers of the first set and of the second set are not active at the same time, it is not possible to obtain an acoustic transmission with a sufficient sound level (i.e. −3 dB with respect to the desired sound level) over a continuous frequency band of two octaves.

When both sets of transducers are activated at the same time (configuration 3), the transmission sound level over two octaves is increased, but it is still insufficient however, because at certain frequencies it is more than 3 dB below the desired sound level. With the use of phase-shifters according to the calibration method in configuration 4, it is possible to obtain a continuous transmission frequency band of at least two octaves with a sufficient sound level, since it is greater than −3 dB with respect to the desired maximum level.

Although its use is intended here for inclusion in a variable-depth sonar towed body, an acoustic antenna according to the invention may nonetheless be installed on any carrier subject to the installation of protection by a dome. Use on a fixed station is also possible and then does not require any special protection.

The invention claimed is:

1. An acoustic antenna (ANT) intended to equip a sonar, the antenna being centered around a first longitudinal axis (A1) and comprising at least a first set of at least two transducers (T1) and a second set of at least two transducers (T2) stacked along said longitudinal axis, each transducer having at least one radial mode having a resonance frequency, referred to as a radial frequency, and one cavity mode having a resonance frequency, referred to as a cavity frequency, wherein the transducers of the first set are configured to transmit sound waves in a first continuous frequency band extending at least between the cavity frequencies and the radial frequencies of the transducers of the first set and the transducers of the second set are configured to transmit sound waves in a second continuous frequency band extending at least between the cavity frequencies and the radial frequencies of the transducers of the second set, in that the cavity frequency of a transducer of the second set is substantially equal to the radial frequency of a transducer of the first set plus or minus (fr1-fc1)/10, fr1 being the radial frequency of the transducer of the first set and fc1 being the cavity frequency of the transducer of the first set and wherein the transducers of the second set are placed between the transducers of the first set and in that no transducer of the first set is placed between the transducers of the second set;
wherein said acoustic antenna further comprises:
at least a first phase-shifter (D1) arranged so as to introduce a first phase shift ($\Delta\phi1$) between an excitation signal of the transducers of the first set and an excitation signal of at least a sub-group of transducers of the second set; and
at least a second phase-shifter (D2) arranged so as to introduce a second phase shift ($\Delta\phi2$) between excitation signals of different sub-groups of transducers of the second set.

2. The acoustic antenna as claimed in claim 1, wherein the transducers of the second set are divided into sub-groups, each sub-group comprising at least two transducers of the second set, a spacing between each sub-group being greater than or equal to a spacing between two transducers of one and the same sub-group, and each sub-group having at least one cavity mode having a resonance frequency, referred to as the group cavity frequency.

3. The acoustic antenna as claimed in claim 2, wherein the second set comprises seven transducers divided into three sub-groups, the first sub-group (SG1) comprising two transducers, the second group (SG2) comprising three transducers, the third sub-group (SG3) comprising two transducers, and the second sub-group being placed between the first and the third sub-group.

4. The acoustic antenna as claimed in claim 2, wherein the group cavity frequency of at least one sub-group is equal to the radial frequency of the transducers of the first set plus or minus (fr1-fc1)/10 and the group cavity frequency of at least one other sub-group is equal to the cavity frequency of the transducers of the first set plus or minus (fr1-fc1)/10.

5. The acoustic antenna as claimed in claim 1 comprising passive elements (P1) stacked along the first longitudinal axis, surrounding the transducers of the second set and having at least one radial mode having a resonance frequency, referred to as the radial frequency, equal to a radial frequency of the transducers of the second set plus or minus 0.1×fr2, advantageously equal to a radial frequency of the transducers of the second set plus or minus 0.05×fr2, with fr2 the radial frequency of the transducers of the second set and also having at least one cavity mode having a resonance frequency, referred to as the cavity frequency, within the first continuous frequency band.

6. The acoustic antenna as claimed in claim 5, wherein the passive elements are made of a material such that the E/$\rho$ ratio of this material is higher than that of the material forming the transducers of the second set, E being the Young's modulus and $\rho$ the density of the materials.

7. The acoustic antenna as claimed in claim 6, wherein the passive elements are cylinders having a diameter larger than that of the transducers of the second set.

8. The acoustic antenna as claimed in claim 1, wherein the transducers of the first set and of the second set are FFR ("free-flooded ring") transducers made of piezoelectric ceramic or of magnetostrictive ceramic or of electrostrictive ceramics.

9. The acoustic antenna as claimed in claim 1, wherein the transducers of the first set and of the second set have a circular, trapezoidal or polygonal cross section.

10. The acoustic antenna as claimed in claim 1 comprising at least a third set of at least two transducers (T3) stacked along K longitudinal axes (A2, A3) parallel to the first longitudinal axis (A1), K being greater than 1, the transducers of the third set having at least one radial mode having a resonance frequency, referred to as the radial frequency, and one cavity mode having a resonance frequency, referred to as the cavity frequency, equal to the radial frequency of the transducers of the second set plus or minus (fr2-fc2)/10, fr2 being the radial frequency of the transducers of the second set and fc2 the cavity frequency of the transducers of the second set, the transducers of the third set being configured to transmit sound waves in a third continuous frequency band extending at least between their cavity frequency and their radial frequency, the third continuous frequency band having at least one frequency higher than the frequencies of the first and second continuous frequency bands, and a meeting of the first, second and third continuous frequency bands forming a continuous frequency band.

11. The acoustic antenna as claimed in claim 10, wherein the K longitudinal axes are coincident with the first longitudinal axis.

12. The acoustic antenna as claimed in claim 1 comprising N+1 groups of transducers of the same type and N phase-shifters arranged so as to introduce a phase shift between an excitation signal of the transducers of the first group and an excitation signal of another group, N being an integer greater than 1.

13. A method for calibrating an acoustic antenna as claimed in claim 1, further comprising the following steps:
   a: exciting a first group of transducers of the same type and shorting the other transducers;
   b: far-field measuring a phase of the pressure waves generated by the transducers of the first group;
   c: exciting a second group of transducers of the same type and shorting the other transducers;
   d: far-field measuring a phase of the pressure waves generated by the transducers of the second group;
   e: calculating the phase difference between the phase obtained in step b and the phase obtained in step d;
   f: adjusting a phase-shifter so that it introduces a phase shift equal to the difference calculated in step e to the excitation signal sent to the transducers of the second group.

* * * * *